United States Patent

[11] 3,564,170

[72] Inventors Karl Rehm;
Hermann Schwarz, Constance, Germany
[21] Appl. No. 819,036
[22] Filed Apr. 24, 1969
[45] Patented Feb. 16, 1971
[73] Assignee Licentia Patent-Varwaltungs-G.m.b.H.
Frankfurt Main, Germany
[32] Priority Mar. 22, 1969
[33] Germany
[31] P 19 14 823.3

[54] MULTIPLE SHEET REMOVAL DETECTOR EMPLOYING ELECTRICALLY CONTACTING ROLLERS
5 Claims, 4 Drawing Figs.

[52] U.S. Cl. ................................................ 200/61.41; 340/259
[51] Int. Cl. .................................................. H01h 3/16
[50] Field of Search ........................................ 200/61.13, 61.14, 61.41, 61.42, 61.19, 46; 340/259

[56] References Cited
UNITED STATES PATENTS

| | | | | |
|---|---|---|---|---|
| 2,494,615 | 1/1950 | Hayes | | 200/61.41 |
| 2,806,096 | 9/1957 | Christopher | | 200/46 |
| 3,204,054 | 8/1965 | Ouellette | | 340/259X |
| 3,179,763 | 4/1965 | Kummer | | 200/61.41 |
| 2,429,159 | 10/1947 | Hayes | | 235/92 |

Primary Examiner—Robert K. Schaefer
Assistant Examiner—M. Ginsburg
Attorney—Spencer & Kaye ABSTRACT: Apparatus for testing sheets to determine if a given thickness has been exceeded includes a fixed roller having a generally cylindrical surface including a sheet-carrying portion and an electrical contact portion, and a movable roller having a similar sheet-carrying portion and an electrical contact portion. The diameters of the electrical contact portions and the sheet-carrying portions are such that in normal operation the electrical contact portions of the two rollers are in contact with each other while the two sheet-carrying portions are spaced by a distance which permits passage of a sheet between them without displacement of the movable roller. In the event that this thickness is exceeded, as for example, would occur if more than one sheet were delivered between the rollers at one time, the movable roller would be moved so that the electrical contact would be broken to trigger an appropriate signal circuit.

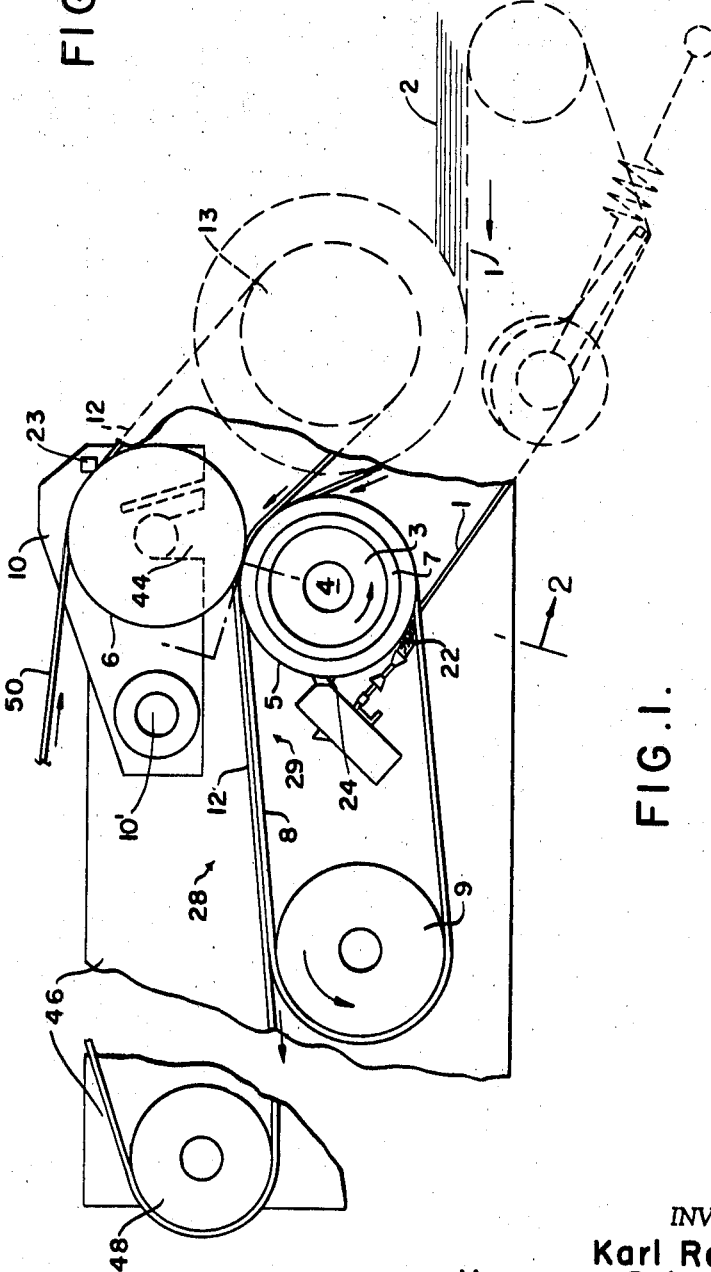

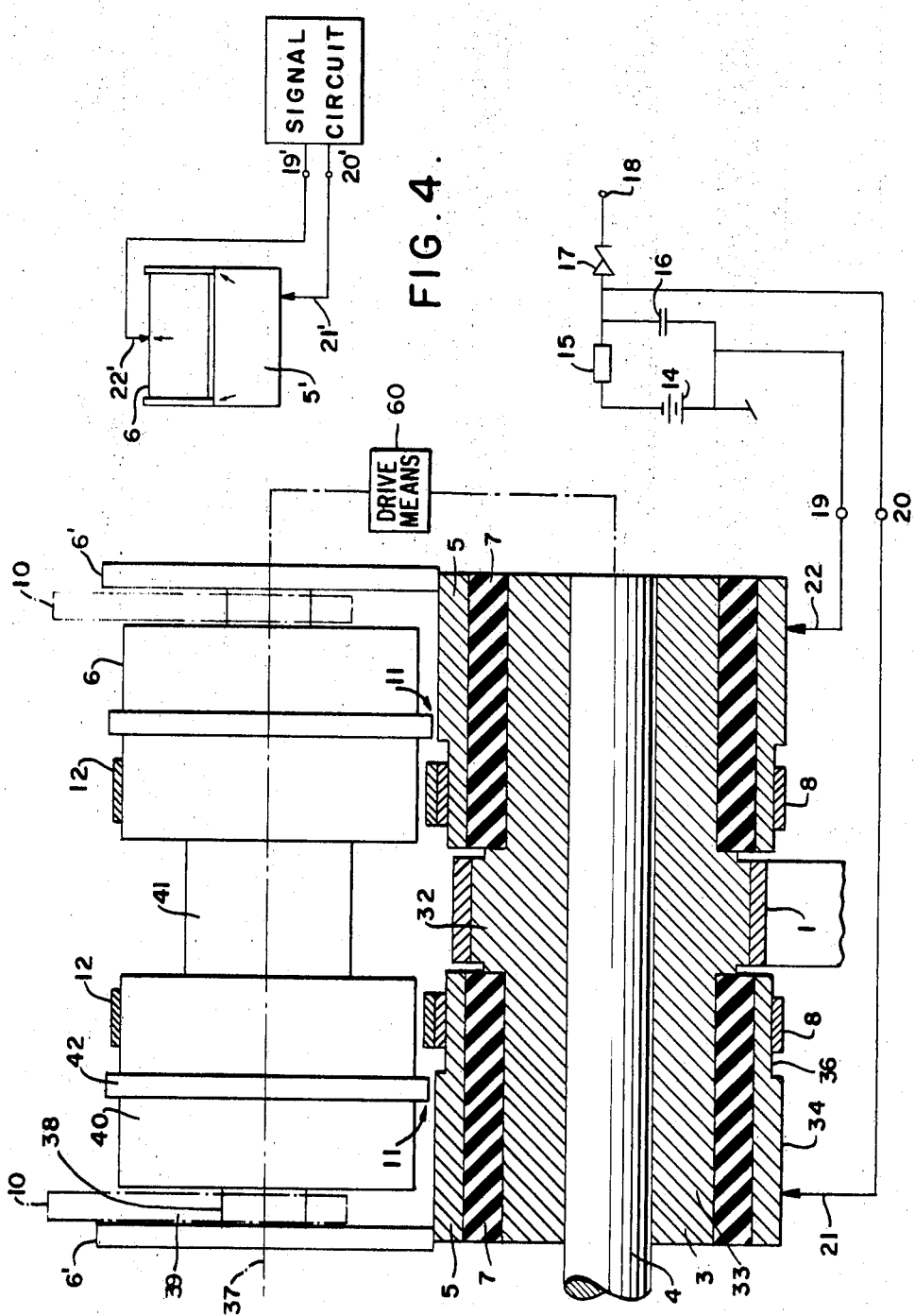

MULTIPLE SHEET REMOVAL DETECTOR EMPLOYING ELECTRICALLY CONTACTING ROLLERS

BACKGROUND OF THE INVENTION

1. Field of the invention

This invention relates to a device for testing the thickness of sheets including paper money, and more particularly to such a device in which the sheets are passed between a fixed and a movable roller and a signal circuit is influenced depending upon the amount of deflection of the movable roller occurring in response to the thickness of the sheets.

2. Description of the Prior Art

In known devices of this type the deflectable roller is connected to a lever system, which transmits the deflection and produces a measuring stroke as high as possible at the end of the lever. A contact is disposed at the end of the lever and is actuated after the lever has moved through a certain distance which depends upon a predetermined thickness of the sheet. Uncertainties arise with these devices as a result of play in the bearings, deformation, and the movement of parts out of alignment. As a result, even with high production accuracy, a constantly high measuring or testing accuracy is not achieved. A high accuracy, however, is necessary if such a thickness testing device is used to determine that only one sheet of paper money is present at a time after separation from a stack, and if the device is to indicate double removals with high dependability.

SUMMARY OF THE INVENTION

Among the objects of the present invention is the provision of an apparatus of the above-mentioned type which keeps within deviation errors of as little as 0.01 mm. over a long period of operation and which is of simple and mechanically rugged construction.

Briefly stated, these and other objects of the invention are achieved by the provision of a sheet-carrying region and an electrical contact region on the cylindrical surface of each of the rollers. The rollers are mounted so that when the movable roller is in its undeflected position, the electrical contact portions of both rollers are in engagement with each other. The diameter of at least one electrical contact portion is sufficiently larger than that of the sheet-carrying portion of its roller so that, in the undeflected position, the spacing between the sheet-contacting portions of the two rollers is large enough to permit passage between the rollers of a single sheet without deflecting the movable roller. The electrical contact portions of the two rollers are so connected into a signalling circuit so that their separation, in response to the passage of a sheet of greater than normal thickness between the rollers, produces an appropriate indication.

BRIEF DESCRIPTION OF THE DRAWINGS

FIG. 1 is a side view of a device according to the present invention for testing the thickness of paper money, associated delivery equipment for separating the money from a stack and delivering it to the thickness tester of the present invention being shown in dotted lines.

FIG. 2 is an enlarged section taken along the line 2—2 of FIG. 1 and including a schematic diagram of a signaling circuit.

FIG. 3 is a schematic representation of a signaling circuit usable with the device of FIG. 1 and corresponding to FIG. 2.

FIG. 4 is a schematic representation of another signaling circuit useful with the device of FIG. 1.

DESCRIPTION OF THE PREFERRED EMBODIMENTS

Referring now to FIG. 1 and 2 will be seen at the right-hand side in dotted lines of FIG. 1, elements of a separator device as disclosed in applicants' copending application Ser. No. 819,712 for "Sheet Separator" of common ownership with this application and filed Apr. 28, 1969. This device includes a transfer belt 1 which separates individual bills 2 from a stack of paper money passes beneath a guide roller 13 and carries the bills around a roller body 3 which rotates about a shaft 4 having a fixed position on support structure 46. Belt 1 passes around roller 3 and then back to the separator device. Also mounted on shaft 4 are a pair of fixed rollers 5 one of which is on each side of roller 3. A portion of the periphery of rollers 5 is in contact with a deflectable roller 6 which is mounted in a pair of rocker arms 10 which are pivoted on support structure 46 so as to permit the rollers 6 to be raised out of contact with rollers 5. One lower delivery belt 8 is entrained about each of the fixed rollers 5, and a pair of upper delivery belts 12 are passed about roller 6. The lower run 28 of the upper belt and the upper run 29 of the lower belt run together so as to carry a bill delivered by the transfer belt 1 to a further destination. Each of the rollers 5 and 6 includes sheet-carrying portions, and electrical contact portions, which are electrically connected to a signal circuit 30 (FIG. 3) as is hereafter described in greater detail.

Referring now to FIG. 2, the structure of the rollers 5 and 6 will be seen in more detail. For spatial reasons rollers 5 are mounted for rotation about the same shaft 4 which carries the rollers 3 of the transfer belt 2. Roller 3 includes a central belt-carrying portion 32 and side journal portions 33. Portions 32 and 33 are both cylindrical, portions 32 having a greater diameter than portions 33. Portion 32 has an axial length generally equal to the width of transfer belt 1 which is looped about it. Portions 33 carry bearing bushings 7 made of insulating material. The rollers 5 are mounted on bushings 7 and formed of an electrically conductive material. The cylindrical periphery of rollers 5 is divided into a recessed portion 36 and an outer portion 34. The depth of recessed portion 36 below outer portion 34 is equal to the thickness of lower delivery belt 8. Accordingly, the top of the upper run 29 of the belt is level with the remainder of the roller periphery and a level bed is formed for the reception of a bill 2.

Roller 6 is formed with a number of adjacent cylindrical portions having different diameters and a common axis 37. Two electrical contact portions 6' are formed, one at each end of the roller. The diameter of portions 6' is greater than the diameter of the remainder of the roller. Axially inwardly of each electrical contact portions 6' bearing portions 38 are formed of a diameter which is substantially smaller than either electrical contact portion 6' or body portions 40 which are located on the other side of the bearing portion. A slot 39 for the reception of rocker arms 10 is defined by the facing sides of the electrical contact portion 6' and body portion 40. Slot 39 has a width only slightly greater than that of arms 10. Cylindrical sheet contact, or engaging, portions 42 project outwardly from body portion 40. The radius of the cylindrical sheet contact portion 42 is less than the radius of the electrical contact portions 6' by a distance which is greater than the normal expected thickness of one bill 2, but less than the thickness of two bills. A central portion 41 of reduced diameter separates the body portions 40 on each side of the roller. A tapered slot 44 is located in the bottom half of each rocker arm 10. Slot 44 has a width which is slightly greater than the diameter of the bearing portion 38. The end of each arm which is opposite to the slot 44 is mounted for rotation about a shaft 10' which is secured to support structure 46. In operation, arms 10 are mounted within slot 39 of roller 6 with the rocker arm slots 44 straddling the bearing portion 38.

Two upper delivery belts 12 pass about a drive roller 48 mounted on the support structure 46, then the upper reaches 50 of these belts pass over a tension roller (not shown) and the top of the body portion 40 of roller 6 then about a guide roller 13 which is mounted on the separator device for spatial reasons, then the belts continue below roller 6 so that the lower run 28 of each belt rests upon the upper run 29 of the lower delivery belts 8, and then back to drive roller 48.

The lower delivery belts 8 are entrained about the recessed portion 36 of rollers 5, and about a drive roller 9, which is also mounted on support structure 46.

Support structure 46 carries electrical contact brushes 21 and 22, one of which is mounted on each side to engage the outer periphery 34 of rollers 5. Cleaning felts 24 are also mounted on the support structure to remove dust, etc. from the electrical contact portion of roller 5, and similar cleaning felts 23 are mounted on arm 10 to clean the electrical contact portion 6' of roller 6.

The electrical contact brushes 21 and 22 are respectively connected to contacts 19 and 20 to which the signal circuit 30 leads are connected. The signal circuit 30 may include a power source 14, and a resistor 15 which are paralleled by a capacitator 16, both of which are connected to a Zener diode 17, and an output terminal 18. Power source 14 and resistor 15 are normally short circuited through the rollers 5 and 6, but breaking of the contact between the rollers supplies the output of power source 14 to Zener diode 17 and output terminal 18.

In use the deflectable roller 6 is held with its electrical contact portions 6' in contact with a portion of the periphery of 34 of roller 5. It is held in position by the arms 10 and the upper run 50 of upper delivery belt 12 also serves to press roller 6 toward roller 5.

At such times the outermost portions of the periphery 34 of roller 5 are in engagement with electrical contact portions 6', and accordingly these regions serve as electrical contact regions for the roller 5. Regions of periphery 34 which are opposite the sheet contacting portions 42 of roller 6 serve as sheet contacting or engaging portions. The dimensions of the electrical contact portion 6' and the sheet-contacting portion 42 of roller 6 are so selected that a measuring gap 11 exists between sheet-contacting portion 42 and the periphery 34 of roller 5. The dimensions of this gap are such that it is greater than the thickness of one bill, less than the thickness of two bills.

In operation the transfer belt 1 carries a bill 2 up into the region between the upper and lower delivery belts 8 and 12. These belts engage the bill and carry it to a further destination. During this time bill 2 passes between the sheet-contacting portion 42 of roller 6 and periphery 34 of roller 5. These portions could also be considered as sheet-carrying portions. If only one bill is present it passes through gap 11 without effect. However, if more than one bill is carried at one time the sheet-contacting portion 42 is engaged by the upper bill and lifted. This breaks the contact between the electrical contact portions of the two rollers.

As will be observed in FIG. 2 and in FIG. 3 in which the insulating bushings 7 connected to rollers 5 are shown schematically, the electrical contact between the signal circuit terminals 19 and 20 is normally completed by a series circuit arrangement passing through roller 6 from the two electrical contact portions 6'. Interruption of the circuit causes the development of an appropriate signal at output terminal 18. However, in the event of relatively short interruptions of electrical contact, as might for example be caused by presence of dust particles, the parallel capacitor 16 does not charge sufficiently to provide an output signal.

FIG. 4 illustrates another embodiment of the invention is which a roller 5' is electrically continuous as distinguished from the roller 5 in which two separate electrical contact portions are insulated from each other by the bushings 7. In this case, the brush 21' connected to the signal circuit terminal 20' is connected to the roller 5' and the brush 22' connected to the signal circuit terminal 19' engages roller 6. Accordingly, the electrical contacts between the two rollers formed by the contact portions 6' are disposed parallel to one another. Therefore, the short circuit between the terminals 19' and 20' is eliminated only when both contacts are simultaneously interrupted.

The contact making arrangement of either embodiment may be made even more dependable by driving the rollers 5 and 6 by drive means 60 in such a manner that the peripheral speed of each roller in the area of the zone 6' differs by a small amount.

The current source 14 and the resistor 15 are normally short circuited through the two rollers. When the short circuit is broken a voltage is delivered which is strong enough to exceed the breakdown voltage of the Zener diode 17 and a signal is delivered to the output terminal 18. Very short interruptions of the circuit, such as might be caused by the presence of dust on the rollers, do not cause the delivery of a sufficiently strong signal to pass the Zener diode since when the short circuit is first interrupted the time required to charge capacitor 16 prevents the necessary voltage increase from occurring in an extremely short interval.

It will be understood that the above description of the present invention is susceptible to various modifications, changes and adaptations.

We claim:

1. Apparatus for testing sheets to determine if a given thickness has been exceeded, comprising, in combination:
   a. support means;
   b. a first roller mounted for rotation on the support means about a fixed axis, said first roller having a generally cylindrical surface including a sheet engaging portion and an electrical contact portion, said portions being in different axial positions on said first roller;
   c. a second roller also having a generally cylindrical surface including a sheet carrying engaging portion and an electrical contact portion in axial positions corresponding to those of said first roller;
   d. means mounting the second roller on the support means for rotation about an axis which is generally parallel to that of said first roller and for movement between a first position in which its electrical contact portion is in contact with the electrical contact portion of the first roller and a second position in which said electrical contact portions are spaced from each other;
   e. said electrical contact portion on at least one roller having a diameter which is larger than that of the sheet-engaging portion on said roller such that when the electrical-contacting portions of the first and second rollers are in engagement with each other the sheet-carrying portions of the rollers are spaced by a distance which permits passage of only one sheet therebetween without deflection of said second roller and which causes the simultaneous passage of more than one sheet therebetween to deflect said second roller for disengaging said electrical contact portions from one another;
   f. means for delivering a sheet between the sheet-contacting portions of said rollers; and
   g. signal circuit means electrically connected to said electric contact portions of each of said rollers for producing a signal in response to the movement of said electrical contact portions away from each other whereby a signal is produced if a sheet having a greater total thickness than is permitted by the spacing between said sheet-carrying portions is delivered between the rollers.

2. The combination defined in claim 1 wherein there are two axially spaced electrical contact portions on each of said rollers, said contact portions being located on opposite sides of the sheet-engaging portion of each roller and being axially spaced from each other by a distance greater than the width of one sheet.

3. The combination defined in claim 2 wherein said signal circuit means includes a circuit in which the two electrical contacts formed by the engagement of the corresponding contact portions on each roller form a series circuit.

4. The combination defined in claim 2 wherein said signal circuit means includes a circuit in which the two electrical contacts formed by the engagement of the corresponding contact portions on each roller form a parallel circuit.

5. The combination defined in claim 1 including means for driving the first and the second roller at speeds such that the peripheral speeds of the electrical contact portions of each roller differ from each other by a small amount.

UNITED STATES PATENT OFFICE
CERTIFICATE OF CORRECTION

Patent No. 3,564,170         Dated February 16th, 1971

Inventor(s) Karl Rehm and Hermann Schwarz

It is certified that error appears in the above-identified patent and that said Letters Patent are hereby corrected as shown below:

In the heading of the patent, line 6, change "Varwaltungs" to --Verwaltungs--. Column 3, line 57, change "is" to --i Signed and sealed this 7th day of September 1971.

(SEAL)
Attest:

EDWARD M. FLETCHER, JR.
Attesting Officer

ROBERT GOTTSCHALK
Acting Commissioner of Pat